United States Patent
Fagundo et al.

(10) Patent No.: US 7,219,161 B1
(45) Date of Patent: May 15, 2007

(54) TECHNIQUES FOR NETWORK ADDRESS AND PORT TRANSLATION FOR NETWORK PROTOCOLS THAT DO NOT USE TRANSLATED PORTS WHEN REQUESTING NETWORK RESOURCES

(75) Inventors: Arturo Fagundo, Westborough, MA (US); Thomas P. Karolyshyn, Cumberland, RI (US)

(73) Assignee: Cisco Technology, Inc., San Jose, CA (US)

( * ) Notice: Subject to any disclaimer, the term of this patent is extended or adjusted under 35 U.S.C. 154(b) by 743 days.

(21) Appl. No.: 09/942,822

(22) Filed: Aug. 29, 2001

(51) Int. Cl.
*G06F 15/16* (2006.01)
(52) U.S. Cl. ...................... 709/245; 709/229
(58) Field of Classification Search .......... 709/245, 709/213, 249, 225, 224, 229; 370/219, 389; 707/9, 3; 455/426; 379/219
See application file for complete search history.

(56) References Cited

U.S. PATENT DOCUMENTS

| | | | | |
|---|---|---|---|---|
| 5,682,534 | A * | 10/1997 | Kapoor et al. ............. | 719/328 |
| 5,740,422 | A * | 4/1998 | Foltz et al. ................ | 707/9 |
| 6,038,589 | A * | 3/2000 | Holdsworth et al. ........ | 709/201 |
| 6,061,708 | A * | 5/2000 | McKeehan et al. ......... | 718/101 |
| 6,182,141 | B1 * | 1/2001 | Blum et al. ................. | 709/227 |
| 6,208,952 | B1 * | 3/2001 | Goertzel et al. ............ | 709/230 |
| 6,219,799 | B1 * | 4/2001 | Kandasamy ................ | 714/4 |
| 6,366,561 | B1 * | 4/2002 | Bender ...................... | 370/238 |
| 6,366,958 | B1 * | 4/2002 | Ainsworth et al. ......... | 709/230 |
| 6,463,456 | B1 * | 10/2002 | Kan et al. .................. | 709/201 |
| 6,483,912 | B1 * | 11/2002 | Kalmanek et al. ......... | 379/219 |
| 6,594,700 | B1 * | 7/2003 | Graham et al. ............. | 709/230 |
| 6,601,090 | B1 * | 7/2003 | Gurijala et al. ............. | 709/213 |
| 6,643,696 | B2 * | 11/2003 | Davis et al. ................ | 709/224 |
| 6,714,987 | B1 * | 3/2004 | Amin et al. ................ | 709/245 |
| 6,742,015 | B1 * | 5/2004 | Bowman-Amuah ........ | 718/101 |

(Continued)

OTHER PUBLICATIONS

"Network Address Translators (NATs) Can Block Netlogon Traffic (Q172227)," Microsoft Product Support Services article, Microsoft Corporation, Aug. 10, 2001.

(Continued)

*Primary Examiner*—Rupal Dharia
*Assistant Examiner*—Kristie D. Shingles
(74) *Attorney, Agent, or Firm*—Hickman Palermo Truong & Becker LLP

(57) ABSTRACT

Techniques for translating between logical addresses and ports of a first network, and logical addresses and ports of a second network connected to the first network at an intermediate device include receiving a first packet at the intermediate device from a first device having a first address on the first network. A second packet is sent to a second device on the second network in response to receiving the first packet. The second packet includes, in a source address field, a particular address of the intermediate device on the second network. It is determined whether the first packet includes a resource registration message that registers a first resource on the first device with a protocol server for a particular protocol. The protocol server is available at the second device on the second network. If the first packet includes the resource registration message, then information in the resource registration message for uniquely requesting the first resource is determined. The first information is stored in a first data structure in association with the first address. As a result, network address and port translation (NAPT) functions in a system using NetBIOS protocol.

28 Claims, 8 Drawing Sheets

U.S. PATENT DOCUMENTS

| | | | |
|---|---|---|---|
| 6,748,448 B1* | 6/2004 | Barrera et al. | 709/245 |
| 6,772,419 B1* | 8/2004 | Sekiguchi et al. | 719/319 |
| 6,785,542 B1* | 8/2004 | Blight et al. | 455/426.1 |
| 6,801,906 B1* | 10/2004 | Bates et al. | 707/3 |
| 6,826,624 B1* | 11/2004 | Fell, Jr. | 709/245 |
| 6,931,647 B1* | 8/2005 | Firth et al. | 719/332 |
| 6,948,004 B2* | 9/2005 | Gasbarro et al. | 709/250 |
| 6,968,390 B1* | 11/2005 | Chavez, Jr. | 709/238 |
| 6,986,157 B1* | 1/2006 | Fijolek et al. | 725/111 |
| 7,007,075 B1* | 2/2006 | Coffey | 709/219 |
| 7,139,811 B2* | 11/2006 | Lev Ran et al. | 709/217 |
| 2001/0054101 A1* | 12/2001 | Wilson | 709/225 |
| 2002/0053032 A1* | 5/2002 | Dowling et al. | 713/201 |
| 2002/0112051 A1* | 8/2002 | Ullman | 709/224 |
| 2002/0112076 A1* | 8/2002 | Rueda et al. | 709/245 |
| 2002/0184310 A1* | 12/2002 | Traversat et al. | 709/204 |
| 2003/0007486 A1* | 1/2003 | March et al. | 370/389 |
| 2003/0009551 A1* | 1/2003 | Benfield et al. | 709/224 |
| 2003/0018772 A1* | 1/2003 | Meandzija et al. | 709/223 |
| 2003/0018784 A1* | 1/2003 | Lette et al. | 709/226 |
| 2005/0086641 A1* | 4/2005 | Hussey | 717/121 |

OTHER PUBLICATIONS

Anonymous, IETF Network Working Group, Protocol Standard For A NetBIOS Service On A TCP/UDP Transport: Concepts And Methods, Request for Comments 1001, Mar. 1987.

R. Droms, "Dynamic Host Configuration Protocol," IETF Network Working Group, Request for Comments 2131, Mar. 1997.

S. Alexander et al., "DHCP Options and BOOTP Vendor Extensions," IETF Network Working Group, Request for Comments 2132, Mar. 1997.

P. Srisuresh et al., "Traditional IP Network Address Translator (Traditional NAT)," IETF Network Working Group Request for Comments 3022, Jan. 2001.

* cited by examiner

FIG. 5A

500 NETBIOS-ENABLED NAPT PROCESS

510
PROCESS MESSAGES FOR REGISTERING RESOURCE NAME ON REMOTE NETBIOS NAME SERVER

550
PROCESS MESSAGES FOR RESOURCE ON LOCAL NETWORK

TECHNIQUES FOR NETWORK ADDRESS AND PORT TRANSLATION FOR NETWORK PROTOCOLS THAT DO NOT USE TRANSLATED PORTS WHEN REQUESTING NETWORK RESOURCES

FIELD OF INVENTION

The present invention generally relates to computer telecommunications networks. The invention relates more specifically to network address and port translation for conserving internet protocol (IP) addresses, with a network protocol that uses registered names for requesting network resources and not translated ports.

BACKGROUND OF THE INVENTION

A computer network includes computer processors or "hosts" that host software applications that provide or request services, or both. The hosts may be network terminals or end stations that do not perform network traffic routing or forwarding functions. The hosts communicate with each other through network devices, such as switches and routers, sometimes called intermediate devices, which do perform routing and forwarding functions. When a host is added to a network by connecting directly to another host, or indirectly to another host through one or more intermediate devices, the host must be configured for network operations. For example, the newly added host is assigned a logical network address for itself, and a network address for the intermediate device that routes or forwards its traffic, among other configuration information.

Many computer networks, including the Internet, employ the Transmission Control Protocol and Internet Protocol (TCP/IP) for sending packets of information between devices on the network. TCP/IP packets include data fields holding data indicating a destination, a destination port, a source, and a source port. The destination field holds data indicating the IP address of the intermediate device or host that is to receive the TCP/IP packet. Routers efficiently transmit TCP/IP packets using hardware configured to interpret the destination address in the destination field. An IP address consists of 32 bits, often represented as four 8-bit numbers separated by periods, e.g., A.B.C.D, where the letters A, B, C, D each represent one 8-bit number. An 8-bit number can represent values from 0 though 255. The source field holds data indicating the IP address of the intermediate device or host that sent the TCP/IP packet. The destination port field holds data indicating the service requested on the destination device, so that the destination device provides the packet to the appropriate server process executing on the destination device. The source port is used to distinguish several client processes operating simultaneously on the same host.

Computer networks that employ TCP/IP are proliferating, and as a result, logical network addresses that are used to locate each device on the network have become scarce. In many local networks with many different computers, the number and location of the computers connected to the network may change regularly. In addition, of the many computers physically connected at one time, only a fraction of the computers are on and operating at one time. Thus one or more hosts are being added and dropped frequently.

A specific context in which this problem arises involves large-scale cable modem networks in which voice and other services are delivered over an Internet Protocol (IP) network that uses coaxial cable for communications. In this context, cable modems of end users become active and inactive regularly as users initiate and terminate use of service. In this context, it is wasteful to give every computer a unique and permanent network address. A number of addresses sufficient for the simultaneously operating computers can be shared, and re-assigned as one host drops off the network and another host adds onto the network. Configuring each host is a tedious process to perform manually.

The Dynamic Host Configuration Protocol (DHCP) provides a mechanism through which computers using TCP/IP can obtain network addresses and other configuration information automatically. DHCP is an open standard protocol for dynamic host configuration described in request for comments (RFC) documents numbered 2131 and 2132 available at the time of this writing as rfc2131.html and rfc2132.html, respectively, on the worldwide web (www) at domain dhcp.org. A DHCP server process operates on a DHCP server host that is conveniently located for several hosts on one or more local networks. One or more DHCP server hosts and processes are set up by a system administrator with information to configure the hosts on one or more local networks to reflect the current architecture of those local networks. A DHCP client process operates on each host of the local networks. As used hereinafter, a server refers to the server process and a client refers to the client process unless otherwise indicated to refer to the host or device on which the process executes.

Another mechanism used to conserve scarce IP addresses is the network address and port translation (NAPT) process. NAPT is a process by which many network addresses and their TCP ports are translated into a single network address and its TCP ports. A conventional NAPT is an open standard for address translation described in request for comments (RFC) document number 3022 available at the time of this writing as rfc3022.txt on directory rfc, on the worldwide web (www) at domain ietf.org.

NAPT allows a local network with private addresses to connect to an external network with unique registered addresses. For example, assume that private IP addresses 1.1.1.0 through 1.1.1.255 are used on a local network. These addresses may already be registered on the public Internet to other devices on one or more other networks, or reserved for private addresses only, and so not used by the Internet at all. Thus, these addresses cannot be used by hosts on the local network to send or receive messages over the Internet. To communicate with a device on the Internet, data packets from hosts on the local network must go through an intermediate device with an NAPT process. Each data packet has a source port, often randomly generated at the host for each client process sending one or more messages. The intermediate device has an Internet registered address, for example, 125.125.125.130 and a local address, for example, 1.1.1.1. The NAPT process on the intermediate device translates the 256 private addresses 1.1.1.0 through 1.1.1.255, each with one or more ports, to the single address 125.125.125.130 with 256 or more different ports. For example, the NAPT process maps the 256 hosts, each using a single port, to 256 ports ranging from port 3000 to 3255. On messages originating on the private network for the Internet, NAPT substitutes the translated single address (125.125.125.130) for the source addresses and the translated ports (3000 to 3255) for the source ports, and then sends the message over the Internet. On data packets destined for the hosts on the private network from the Internet, NAPT translates the destination address and destination ports to the associated local IP addresses and local ports, and sends the messages onto the local network.

NAPT is useful for conserving IP addresses in circumstances interconnecting several local networks using private addresses that are not used outside the local network for privacy reasons or because those addresses are invalid outside the local network. Consider a retailer having dozens or hundreds of store locations, each store having its own local network of hosts running cash register processes. Installing a local network at each store is simplified if every local network can use the same set of IP addresses, e.g., 1.1.1.0 through 1.1.1.255.

In addition, if each local network can use the same IP addresses, a limited pool of unique registered IP addresses can be used for all the hosts at a very large number of sites. For example, assume that of 1000 unique registered IP addresses in a pool for the external network, all 1000 are used for 1000 different sites on the corporate wide-area network. At each site, any IP addresses can be used as local addresses, because such addresses are not presented to the wide area network.

A limit for the number of local addresses that can use NAPT in this manner is imposed by the number of unique port values that NAPT can use to distinguish the local addresses. Some ports are well-known ports used by certain processes running on a host. For example the port for an HTTP server is 80 and the port for a DHCP server is 67. The number of ports that are not reserved is well over 32,000. Thus, using NAPT, a pool of 1000 IP addresses can be used to access over 32,000 hosts on each of 1000 local networks—a total of over 32 million hosts.

However, the hardware and software that forms an NAPT process may fail in some important circumstances. For example, when the computers distributed across more than one network operate the Windows operating system of Microsoft Corp., communications that involve NAPT ultimately fail. The Windows operating system uses a network protocol called network basic input/output system (NetBIOS). NetBIOS is an open standard protocol for providing services over a TCP network described in request for comments (RFC) document number 1001, available at the time of this writing as rfc1001.htm on directory rfc, on the worldwide web (www) at domain ietf.org.

Many small offices and home offices use low-cost, personal computers for small local networks. Tens of millions of personal computers already deployed run the Windows operating system. An enterprise that has many sites, each with local networks of personal computers running Windows, is unable to utilize NAPT in attempts to obtain Windows services across those sites over an internetwork. Furthermore, large enterprises installing local networks at large numbers of sites may prefer to install low-cost personal computer networks at each site. Therefore, a failure of NAPT when interconnecting networks of such personal computers prevents data interchange among such enterprises.

Unlike NAPT, a simple network address translation (NAT) process has been configured to operate successfully with the NetBIOS protocol. A NAT process translates a local IP address to one of a set of corporate IP addresses associated with the intermediate device on which the NAT process executes. The number of corporate IP addresses used by the NAT process limits the number of local hosts simultaneously communicating with the corporate network, and is often a small subset of the total number of local hosts. The NAT process associates the local IP address with one corporate IP address of the set of corporate IP addresses for the intermediate device on which the NAT process executes. The NAT process is configured to operate successfully with NetBIOS by replacing the local IP address included in a field of the NetBIOS message originating on the local host having that local IP address. The NAT process configured for the NetBIOS protocol places into that field of the NetBIOS message the one corporate IP address associated with that local IP address by the NAT process. A NAT correction to support NetBIOS is described in a document available at the time of this writing as 27.asp on directory support/kb/articles/q172/2, on the worldwide web (www) at domain support.microsoft.com.

However a NAT process is not as desirable and powerful as a NAPT process. A NAT process is not as efficient as a NAPT process in saving corporate IP addresses. For example, a NAT process uses several corporate addresses; while an NAPT process may use a single corporate IP address. Furthermore, the NAT process does not allow as many local hosts to communicate with the corporate network as a NAPT process. For example, a NAT process may limit the number of local hosts that communicate with devices on the corporate network to 8 or 32; while a NAPT process may allow tens of thousands of local hosts to simultaneously communicate with devices on the corporate network.

Based on the foregoing, there is a clear need for a way to use NAPT with interconnected local networks of computers that use the NetBIOS network protocol.

There is a specific need for a way to use NAPT in systems that run the Microsoft Windows operating system.

Furthermore, there is a need for an NAPT process that works with other network protocols that fail to function with the conventional NAPT process.

SUMMARY OF THE INVENTION

The foregoing needs, and other needs and objects that will become apparent from the following description, are achieved in the present invention, which comprises, in one aspect, a method for translating between logical addresses and ports of a first network, and a logical address and ports of a second network connected to the first network at an intermediate device.

According to this aspect, a first packet is received at the intermediate device from a first device having a first address on the first network. A second packet is sent to a second device on the second network in response to receiving the first packet. The second packet includes, in a source address field, a particular address of the intermediate device on the second network. It is determined whether the first packet includes a resource registration message that registers a first resource on the first device with a protocol server for a particular protocol. The protocol server is available at the second device on the second network. If the first packet includes the resource registration message, then information in the resource registration message for uniquely requesting the first resource is determined. The first information is stored in a first data structure in association with the first address.

In an embodiment of this aspect, the particular protocol uses a well-known port for requesting the first resource. For example, the particular protocol does not use a translated source port provided in the second packet. In an embodiment of this aspect, the particular protocol is the NetBIOS open protocol.

According to another aspect of the invention, a method for translating between logical addresses and ports of a first network, and logical addresses and ports of a second network connected to the first network at an intermediate device, includes receiving a first packet at the intermediate device from a first device not on the first network. A second packet is sent to a second device on the first network in response to receiving the first packet, the second packet including, in a destination address field, data indicating a translated address. It is determined whether the first packet includes a resource request message requesting a resource according to a particular protocol. If it is determined that the first packet includes the resource request message, then first information in the first message for uniquely requesting the resource is determined. Before sending the second packet, the translated address on the first network is determined based on a data item in a first data structure. The data item indicates the translated address and the first information for uniquely requesting the resource.

In other aspects, the invention encompasses an apparatus, computer apparatus, and a computer readable medium, including a carrier wave, configured to carry out the foregoing steps.

These techniques allow an NAPT process to function for the NetBIOS protocol. NAPT fails with the NetBIOS protocol because, in some circumstances, the NetBIOS protocol ignores the source ports generated by the NAPT process, and, instead, uses well-known ports associated with NetBIOS services. By storing in a data structure on the intermediate device with the NAPT process the resource names for NetBIOS servers on the local network in association with their local addresses, as described in this summary, a NetBIOS-enabled NAPT process can associate inbound requests for services on the local network with the local address of the device that hosts the service. NAPT can therefore properly translate the destination address and resource name to the associated local address.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is a functional decomposition chart that illustrates at a high level a NetBIOS-enabled NAPT process, according to an embodiment;

DETAILED DESCRIPTION OF THE PREFERRED EMBODIMENT

A method and apparatus for network address and port translation for network protocols that do not use translated ports are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

—Operational Context

One context in which an enhanced Network Address and Port Translation (NAPT) process (hereinafter called a NetBIOS-enabled NAPT process) may be used is in a corporate wide-area TCP/IP network. In this context, the corporate wide-area network uses corporate IP addresses. The corporate wide-area network is connected to multiple local networks, such as at retail outlets, employing private, local addresses that are not valid corporate IP addresses. Hosts at each site run the Windows operating system and rely on the NetBIOS protocol for accessing resources across the network. A conventional NAPT process fails to support NetBIOS communications in this context.

Embodiments of the invention are not limited to the illustrated context. For example, in other embodiments, instead of a corporate network, the public Internet is used to connect multiple local networks. In those embodiments, the NAPT process translates between local IP addresses and IP addresses registered on the public Internet. In some embodiments, the local networks are virtual private networks using private IP addresses. The data is encrypted for transmission over the Internet, and the IP addresses are translated from VPN private IP addresses to the addresses registered on the public Internet. In other embodiments, the connecting network is a not a wide-area network, but is a geographically confined network. For example, the corporate network may be made up of a few nodes, one in each building on a campus. Each building has a local network using independent IP addresses.

In some embodiments, a different network protocol from NetBIOS is used for accessing network resources on the corporate network. A NetBIOS enabled NAPT process as disclosed herein supports a class of network protocols that the conventional NAPT does not support. The network protocols in this class include protocols that in some circumstances ignore the source port provided by the NAPT process and use instead a well-known port to communicate with servers across the boundary between the corporate and local networks. The network protocols in this class include protocols that register a name, unique across the entire network, for referencing resources provided by the servers.

Figure 1:
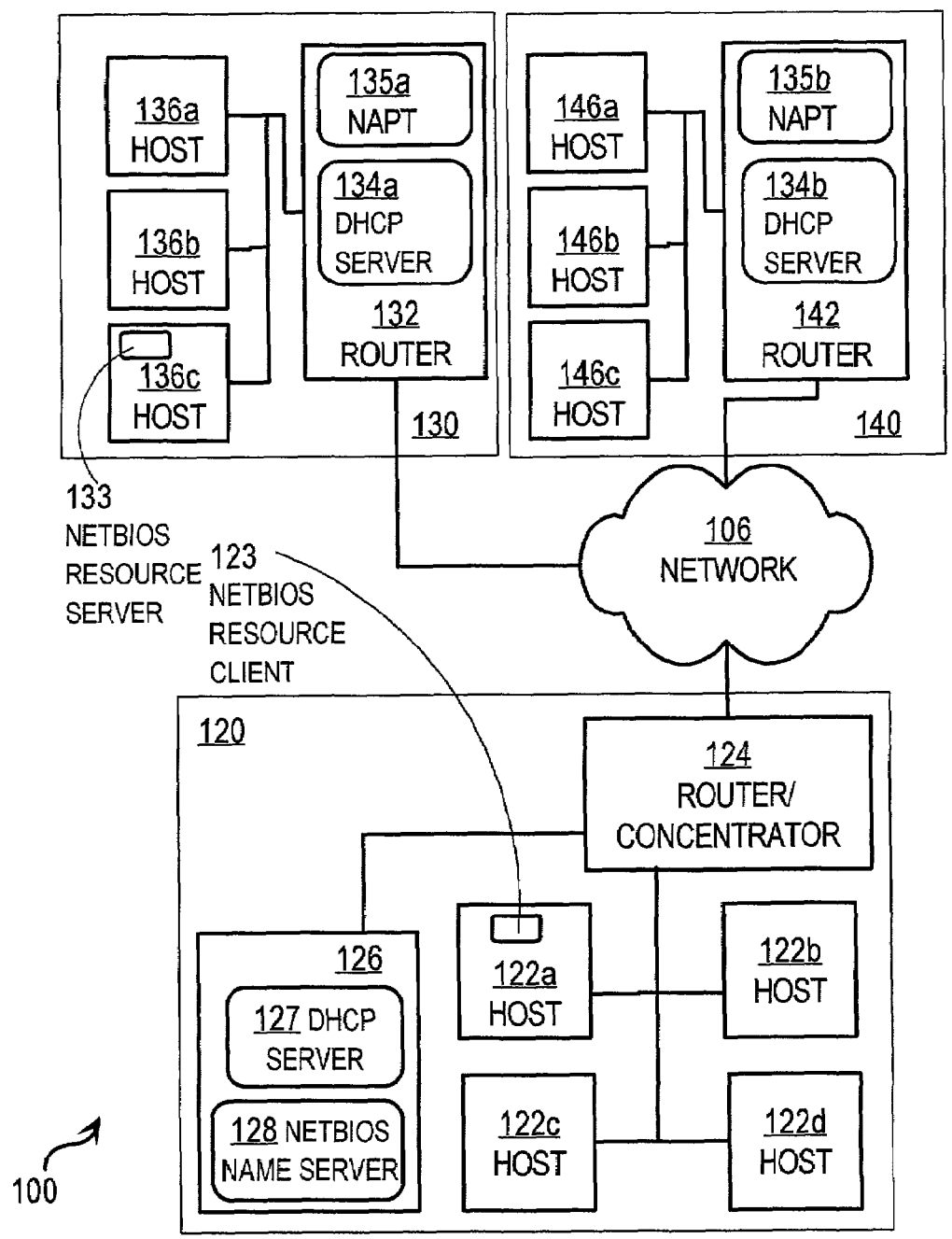
FIG. 1 is a block diagram that illustrates an overview of a two local networks connected to a corporate network, according to an embodiment.

FIG. 1 is a block diagram that illustrates an overview of a system 100 including two local networks 130, 140 connected to a private corporate wide-area network, hereinafter called a corporate network, according to an embodiment.

The corporate network includes private network 120, and routers 132, 142. Private network 120 includes hosts 122a, 122b, 122c, 122d, collectively called hosts 120. Private network 120 also includes host 126 and router/concentrator 124. The devices on the corporate network use corporate IP addresses. DHCP server 127 provides corporate IP addresses to private network 120 and routers 132, 142 from a pool of corporate IP addresses. For example, DHCP server 127 uses the pool of IP addresses from 125.125.125.0 to 125.125.125.255. Then, for example, router 132 is given corporate address 125.125.125.130 and host 126 is given corporate address 125.125.125.2.

The corporate network is connected to local network 130 at router 132. The corporate network is connected to local network 140 at router 142. Local network 130 includes router 132 and hosts 136a, 136b, 136c, collectively called hosts 136. Local network 140 includes router 142 and hosts 146a, 146b, 146c, collectively called hosts 146. To conserve corporate IP addresses, the hosts 136 use a pool of local IP addresses that are not valid corporate IP addresses. DHCP server 134a provides local IP addresses to hosts 136 from the pool of local IP addresses. The hosts 146 use the same pool of local IP addresses as hosts 136. DHCP server 134b provides local IP addresses to hosts 146 from the same pool of local IP addresses that DHCP server 134a uses. For example, both DHCP servers 134a, 134b use the pool of IP addresses from 1.1.1.0 to 1.1.128.255.

An NAPT process 135a runs on router 132 to translate between the ports and local addresses used in data packets traversing local network 130 and the ports and corporate IP addresses used in data packets traversing the corporate network. An NAPT process 135b runs on router 142 to translate between the ports and local addresses used in data packets traversing local network 140 and the ports and corporate IP addresses used in data packets traversing the corporate network.

In some embodiments, the private network 120 is connected directly to routers 132 and 142. In the illustrated embodiment, private network 120 is connected to routers 132 and 142 through the network 106 of a third party. In some embodiments, the third party network is made up of secured leased lines in a circuit switched network. In some embodiments, the third party network 106 includes the public Internet of computer networks. If the third party network includes the public Internet, the corporate network may be exposed to the public. The corporate network can be protected from the public by installing firewall processes at the routers 124, 132, 142. If desired, data can be encrypted by the firewall processes before transmitting data packets over the Internet. Also, the corporate network can be protected from the public if virtual private network processes are provided by routers 124, 132, 142, or by an Internet Service Provider (ISP) to which routers 124, 132, 142 are connected.

According to an embodiment, hosts 122, 126, 136, 146 are NetBIOS hosts running NetBIOS protocol for sharing resources, and NAPT processes 135a, 135b are NetBIOS-enabled NAPT processes. For example, NetBIOS host 136c includes a NetBIOS resource server 133 that provides a resource, such as a service, in response to a request from NetBIOS resource client 123 on NetBIOS host 122a. The NetBIOS hosts communicate with a NetBIOS name server (NBNS) 128 executing on host 126 on the private network 120, as is described in more detail below.

One problem of past approaches using NAPT for NetBIOS communications is that NetBIOS utilizes well-known port 138 when a NetBIOS client requests a resource from a NetBIOS server. If the server is on the local network, a request for that resource on that server from a device on the corporate network comes to the NAPT process with port 138, instead of coming with the translated source port provided by the NAPT process.

For example, a request from client 123 comes to the NAPT process 135a with a destination address 125.125.125.130 and a destination port of 138. The NAPT process cannot associate the port value 138 with a particular one of the local addresses of the devices on the local network. For example, the NAPT process associates the local addresses of the devices on the first network with ports 3000 to 3255, and does not associated any local address with port 138. Thus the conventional NAPT process cannot translate to a local address and port and cannot forward the request for the resource to the correct device on the local network.

Figure 2:
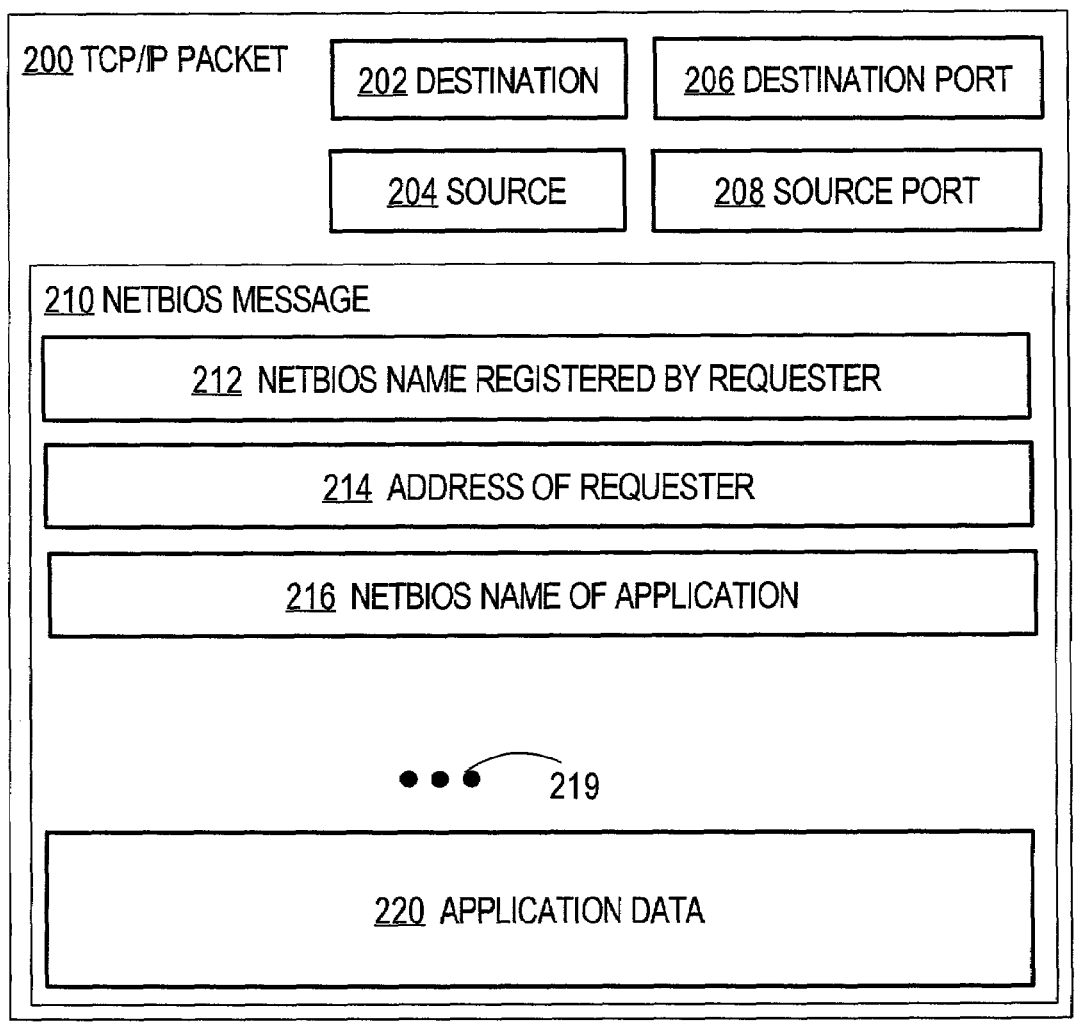
FIG. 2 is a block diagram that illustrates a packet including a message used to communicate among NetBIOS hosts.

FIG. 2 is a block diagram that illustrates a packet including a message used to communicate among NetBIOS hosts.

TCP/IP packet 200 includes a destination address field 202, a destination port field 206, a source address field 204, and a source port field 208. The NetBIOS message 210 is included in the payload portion of TCP/IP packet 200.

The fields in the NetBIOS message 210 depend on the function for the message. Two functions relevant to NAPT are registration of a resource name, and a request for a named resource. These functions are described in more detail below. During registration, field 212 holds data indicating the NetBIOS resource name being registered and field 214 holds data indicating the IP address of the NetBIOS host registering the resource name. During requests for a named resource, field 216 includes the registered name of the resource being requested. For example, the resource may be a software application, or server, that performs some service in response to the request. Field 220 holds data provided to the application, if any. Ellipsis 219 indicates that the NetBIOS message includes other fields as well as the fields illustrated.

In an alternative approach, the NetBIOS standard could be modified to include a source port in a NetBIOS message requesting resources. However, making such a change available to the tens of millions of devices using NetBIOS that are already deployed is impractical. Therefore, there is a need for a way to enable an NAPT process to interoperate in a system that uses NetBIOS, without changing the NetBIOS standard.

—NetBIOS-Enabled NAPT

FIG. 5A is a functional decomposition chart that illustrates at a high level a NetBIOS-enabled NAPT process 500, according to an embodiment.

The NetBIOS-enabled NAPT process 135a in FIG. 1 is an embodiment of the NetBIOS-enabled process 500. In step 510, messages for registering a resource name on a remote NetBIOS name server are processed. For example, the NetBIOS-enabled NAPT process 135a receives and processes data packets with messages for registering a NetBIOS resource name for a device on the local network at a NetBIOS name server (NBNS) on the corporate network.

In step 550, messages for a resource on a local network are processed. For example, the NetBIOS-enabled NAPT process 135a receives and handles data packets received from the corporate network with messages requesting the resource on the device on the local network.

Figure 3:
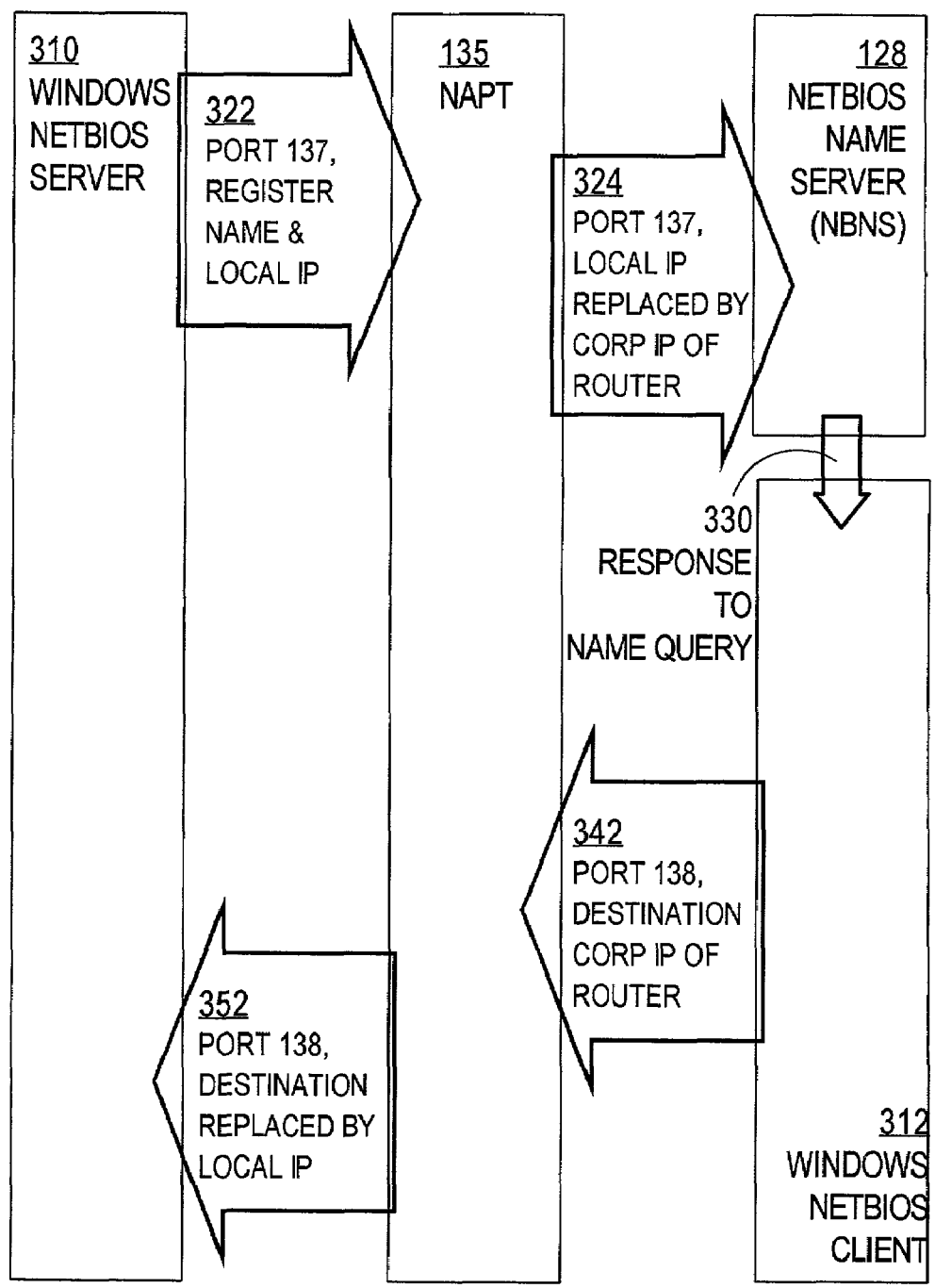
FIG. 3 is a time line diagram that illustrates a sequence of messages passed between a NetBIOS server, an NAPT process on an intermediate device, a NetBIOS name server, and a NetBIOS service client, according to an embodiment.

FIG. 3 is a time line diagram that illustrates a sequence of data packets passed between a NetBIOS server 133, a NetBIOS-enabled NAPT process 135a on router 132, a NetBIOS name server 128, and a client process 123 executing on a NetBIOS host 122a, according to an embodiment. Time elapses from top to bottom in the diagram. NetBIOS registration involves data packet 322 and data packet 324. A NetBIOS resource request involves data packets 330, 342, 352. In the embodiment of FIG. 3, NetBIOS Server 133 is a Windows® NetBIOS Server 310, and client process 123 is a Windows® NetBIOS Client 312.

——NetBIOS Registration

NetBIOS produces a unique name for each resource on the network within a NetBIOS scope. A resource includes a service provided by a server on a host. A scope is a group of NetBIOS hosts managed together on a network. A NetBIOS Name Server (NBNS) process manages the hosts within a NetBIOS scope by ensuring unique names for all resources in the scope and establishing and maintaining a mapping between the IP address of each host in the NetBIOS scope and the unique name. Each NetBIOS host that provides a resource for the network must register a resource name with the NBNS. Each NetBIOS host may register one or more resource names.

When a NetBIOS host joins a network segment, the computer is configured with an IP address for itself and an IP address of a router on the same network segment and an IP address of the NBNS. A network segment consists of all devices not separated by intermediate devices, and the one or more intermediate devices contiguous with those devices.

For example, referring again to FIG. 1, local networks 130, 140 are network segments. When NetBIOS host 136c joins the network segment of local network 130, the configuration information is provided by the DHCP server 134a in response to a DHCP message broadcast by the host 136c. In some systems, this information is provided in a disk file stored on the host computer and automatically read upon start-up. In some systems, a human administrator types in the information.

The joining NetBIOS host then generates a name for a resource on the host, such as a NetBIOS file server on the host, and attempts to register the name at the NBNS 128 by sending a data packet 322 to the NBNS. If the generated name is successfully registered as a unique name within the NetBIOS scope, then the generated name is used by other NetBIOS hosts (e.g., NetBIOS clients for the resource) within the scope for subsequent communications with the resource on the joining host (the NetBIOS server for the resource).

For example, in FIG. 1, assume that host 136c joins the local network 130 and is configured with a local IP address of 1.1.1.6 for itself, a local address of 1.1.1.1 for the router 132, and a corporate IP address of 125.125.125.2 for the host 126 with the NBNS 128. A NetBIOS resource server 133 on the joining host generates a name to refer to itself that is likely be unique, such as "StationQail.fileserver"

The host attempts to register the resource using a NetBIOS message in a TCP/IP data packet 322. The data packet has a source address of the local IP address for the joining host, a source port generated by the joining host, a destination address of the NBNS server, and a destination port of 137. The destination port value 137 indicates to the host at the destination address that the payload is a NetBIOS name registration message that is delivered to the NBNS.

For example, the NetBIOS resource server 133 generates a data packet 322 with fields as listed in Table 1 below. Data indicating the IP address 125.125.125.2 of the host 126 for the NBNS 128 is inserted in the destination IP address field 202, and data indicating port 137 is inserted in the destination port field 206. An arbitrary port number "2345" is generated by the NetBIOS resource server 133; and data indicating that value is inserted in the source port field 204. Data indicating the IP address 1.1.1.6 of the host 136c of the resource server 133, is inserted in the source address field 204 of the data packet and in the NetBIOS message payload of the packet in the Requestor's IP address field 214. The NetBIOS message payload also includes data indicating the name "StationQuail.fileserver" being registered with the NBNS 128 in the requestor's registered name field 212.

TABLE 1

Example Data Packet from NetBIOS Server

| Data packet field | Sample Value |
| --- | --- |
| Destination address | 125.125.125.2 |
| Destination port | 137 |
| Source address | 1.1.1.6 |
| Source port | 2345 |
| Requestor's registered name | StationQuail.fileserver |
| Requestor's IP address | 1.1.1.6 |

The data packet 322 is delivered to an NAPT process on the intermediate device between the joining host and the NBNS. As shown in FIG. 3, the data packet is delivered to a NetBIOS-enabled NAPT process 135a on router 132. The NAPT process translates the source address and source port of the data packet.

Figure 4:
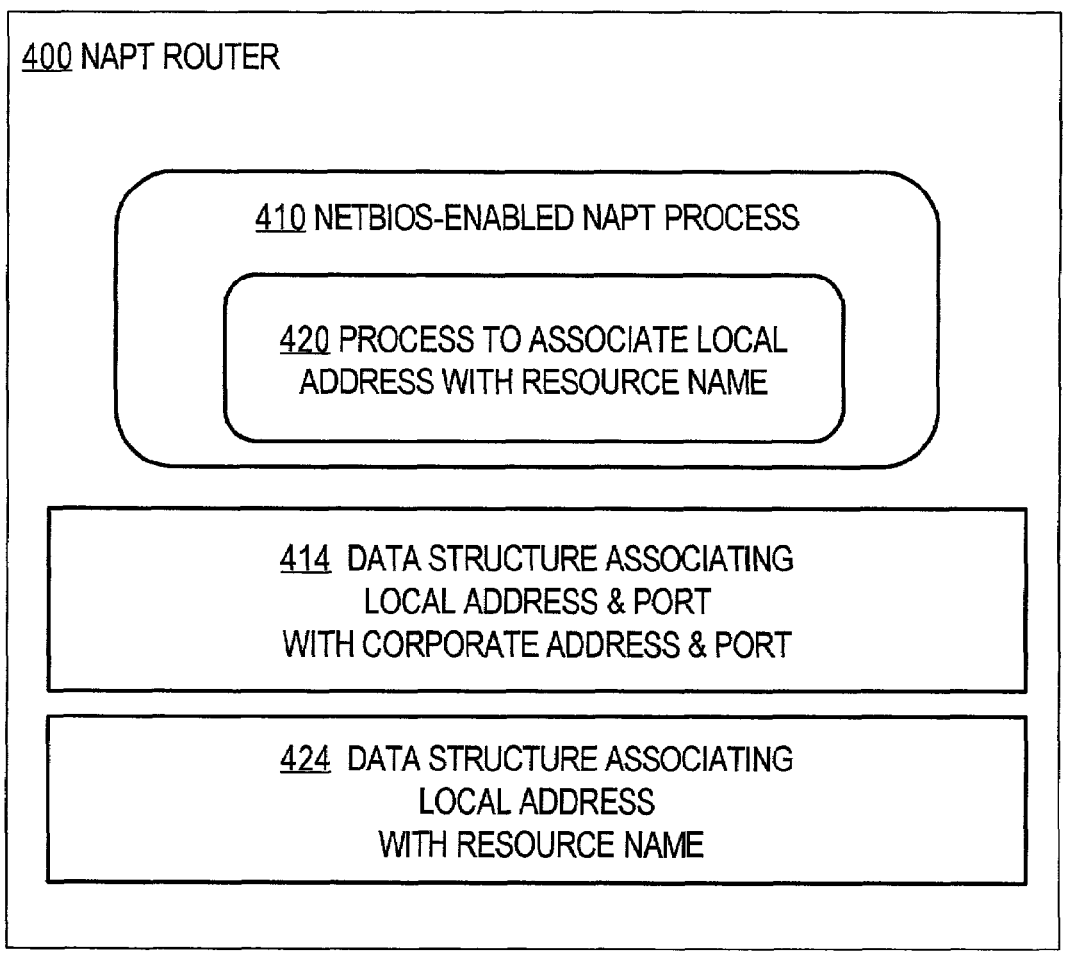
FIG. 4 is a block diagram that illustrates a router with a NetBIOS-enabled NAPT process, according to an embodiment.

FIG. 4 shows structural components of the NetBIOS-enabled NAPT process on a NAPT router 400 serving as the intermediate device. For example, routers 132, 142 in FIG. 1 are NAPT routers like NAPT router 400. The NAPT router 400 includes NetBIOS enabled NAPT process 410, which includes a process 420 to associate a local address with a information to uniquely request the resource on the device at that local address. For example, the local address is associated with the unique NetBIOS name for the resource, as described in more detail below. The illustrated NetBIOS-enabled NAPT process uses two data structures 414, 424. The data structures reside in memory. In some embodiments the data structures are also stored in persistent storage. In other embodiments, a single data structure is used for all the data in illustrated data structures 414, 424.

When the data packet 322 is received, the local IP address in the source address field is replaced by the corporate address of the intermediate device. For example, NAPT 135a translates the source address from the local IP address 1.1.1.6 of host 136c to the corporate IP address 125.125.125.130 of the router 132. The NAPT process also generates a translated source port that is unique for a given combination of local IP address and source port in all data packets received on the local network for delivery over the corporate network. For example, the NAPT 135a generates a translated source port of 3000. The local IP address and original source port are stored in the data structure 414 in association with the corporate address and translated port. For example, the values listed in Table 2 are stored in a data item in data structure 414.

In the illustrated embodiment, the translated address is not included in the data item because the translated address is always the address of the router 132 on the corporate network, e.g., 125.125.125.130. Whenever a data packet is subsequently received at router 132 from a device on the local network with a source address of 1.1.1.6 and a port of 2345, the source address is translated to the source address of the router 132 on the corporate network and the source port is translated to source port 3000. Whenever a data packet is subsequently received at router 132 from a device on the corporate network with a destination address of 125.125.125.130 and a destination port of 3000, the destination address is translated to the local address 1.1.1.6 and the port 2345 based on the data item listed in Table 2.

TABLE 2

Example Values of Data Item in One NAPT Data Structure

| Data Item field | Sample Value |
|---|---|
| Local IP address | 1.1.1.6 |
| Original port | 2345 |
| Translated port | 3000 |

When another data packet is received from local source address 1.1.1.6 with a different port, another data item is added to data structure 414 with a unique translated port, e.g., 3001. When another data packet is received from another local source address, e.g., 1.1.1.3, with the same port or another port, another data item is added to data structure 414 with a unique translated port, e.g., 3002. If a data packet is received from a local address and port combination already in a particular data item in the data structure, no new data item is added to the data structure. The translated port in the particular data item is used as the translated port. For example, when the NAPT process receives another data packet from local address 1.1.1.6 and port 2345, a data item is not added to data structure 414, and the translated port 3000 is used.

In many network protocols, subsequent data packets directed to the source of the data packet 322 include the translated source address as the destination address and the translated port as the destination port. Such a data packet is delivered to the intermediate device that stored the data item in the data structure 414. The NAPT server then finds the translated port in the data structure 414 and retrieves the associated local IP address and original port.

A new data packet based on the received data packet is then generated. In the new packet, the local IP address replaces the corporate address of the intermediate device in the destination address field. The original port replaces the translated port in the destination port field. However, some data packets generated by NetBIOS clients do not insert the translated port in the destination port. For such data packets, a conventional NAPT process will not be able to identify the data item in data structure 414 that contains the local IP address to insert in the destination field of the new data packet.

Therefore, according to an embodiment, the NetBIOS-enabled NAPT process also stores information in a new data structure 424. In the new data structure 424, a data item is stored that associates the local IP address with information that the NetBIOS protocol uses to uniquely identify and request NetBIOS resources. For example, a data item is stored with data indicating the local IP address and the resource name.

Table 3 shows the contents of a data item in the new data structure, according to the illustrated example. In some embodiments, data items are added to the new data structure 424 only if the data structure being translated includes a NetBIOS registration message, e.g., a data packet with destination port 137.

TABLE 3

Example Values of Data Item in New NAPT Data Structure

| Data Item field | Sample Value |
|---|---|
| Local IP address | 1.1.1.6 |
| Information to uniquely request resource | StationQuail.fileserver |

The NAPT process generates a second data packet based on the first data packet. In the second data packet, the NAPT process replaces the original port in the source port field with the translated port, and replaces the local IP address with the corporate IP address of the intermediate device.

While a conventional NAPT process sends the second data packet after replacing the data in the source port and source address fields, the NetBIOS-enabled NAPT process also replaces a field in the NetBIOS message payload before sending the second message.

As shown in FIG. 2, field 214 in NetBIOS message 210 includes data indicating the address of the requester. The IP address registered by the NBNS with the NetBIOS resource name is based on the data in field 214. Therefore the NetBIOS-enabled NAPT process also replaces the local IP address in field 214 with the corporate IP address of the intermediate device.

For example, the NetBIOS-enabled NAPT process 135a generates a second data packet 324 with fields as listed in Table 4, and sends packet 324 to the NetBIOS Name Server at time t2 after time t1.

TABLE 4

Example Data Packet from NAPT Process to NetBIOS Name Server

| Data packet field | Sample Value |
|---|---|
| Destination address | 125.125.125.2 |
| Destination port | 137 |
| Source address | 125.125.125.130 |
| Source port | 3000 |
| Requestor's registered name | StationQuail.fileserver |
| Requestor's IP address | 125.125.125.130 |

When data packet 324 is received by the NBNS 128, the resource name in field 212 is compared to other names to determine whether the name is unique for the NetBIOS scope. If so, an acknowledgement message is sent back to the NetBIOS resource server. If not, a negating acknowledgement is sent back.

The NBNS sends the acknowledgment or negating acknowledgement in NetBIOS messages inserted into data packets that use, as the destination address and port, the translated source address and translated source port, respectively, from data packet 324. Therefore the acknowledgement and negating acknowledgment are translated to the local address and port by the NAPT process as in the conventional NAPT process, using the first data structure 414.

If a NetBIOS resource name stored in a data item in the new data structure 424 is not successfully registered, the data item is deleted from the data structure 424. The resource name is not registered if no acknowledgement message is received within a certain period, or if a negating acknowledgement is received.

After successful registration, the resource name becomes unregistered under several circumstances. The resource name becomes unregistered when the name is released explicitly by a subsequent message from the NetBIOS resource server. The resource name becomes unregistered when the name is released implicitly by a failure to renew the registration before a registration period expires. If a NetBIOS resource name stored in a data item in the new data structure 424 becomes unregistered, the data item is deleted from the data structure 424.

——NAPT Method for NetBIOS Registration

Figure 5B:
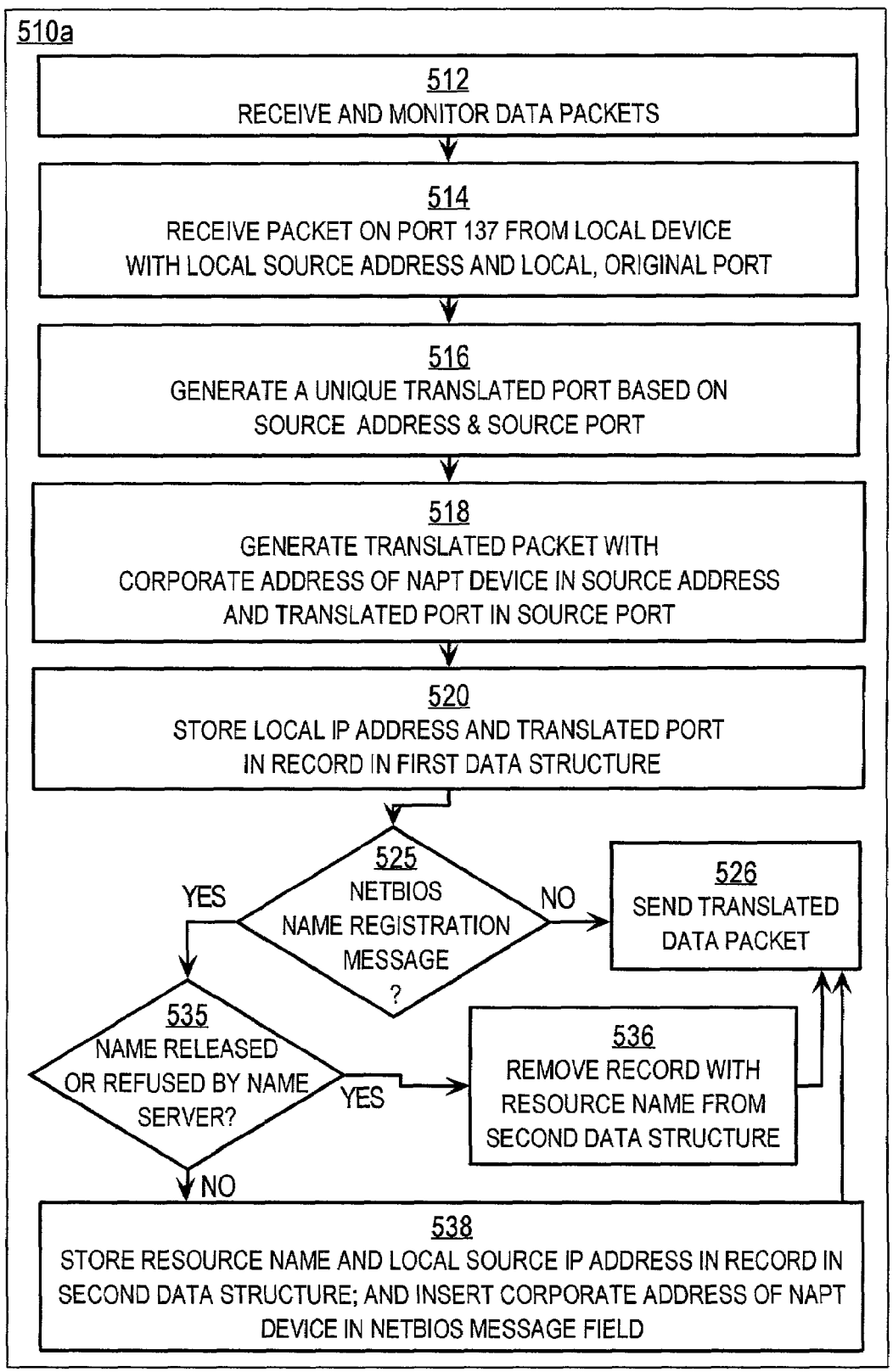
FIG. 5B is a flowchart that illustrates a method for processing resource name registration messages according to one embodiment of the NetBIOS-enabled NAPT process depicted in FIG. 5A.

FIG. 5B is a flowchart that illustrates a method for processing resource name registration messages according to one embodiment 510a of step 510 of the NetBIOS-enabled NAPT process depicted in FIG. 5A. Although steps are depicted in FIG. 5A and subsequent flowchart FIG. 5B in a particular order, in other embodiments the steps occur in a different order or overlapping in time.

In step 512, data packets are received by the NAPT process. The data packets received include some data packets with messages related to registering names for NetBIOS resources.

In step 514, a data packet is received from a local device with a local source address and original, local source port. For example the data packet 322 described in Table 1, above, is received. If a data packet is received from a device on the corporate network, steps 514 through 520 are skipped.

In step 516, a unique translated port is generated based on the source address and the source port. Any technique known at the time the step is implemented may be used to generate the unique port. For example, in one embodiment, a hashing function is used. In another embodiment, a range of ports is used in succession. The ports in use are stored in data structure 414. If a port already appears in data structure 414 for the local source address and the original source port, that port is used as the translated port. If no data item in the data structure 414 already contains both the local source address and the original port, a different port in the range than any port already in data structure 414 is used as the translated port.

In step 518, a second data packet is generated. The second data packet includes the corporate address of the intermediate device on which the NAPT process executes in the source address field. The second data packet includes the translated port determined in step 516 in the source port field. For example, the data packet 324 with data packet fields described in Table 4, above, is generated.

In step 520 the local IP address and translated port are stored in a data item, such as a record, of a data structure. In some embodiments, the original source port is also stored in the data item. For example, the data item described in Table 2, above, is stored in data structure 414.

Step 525 represent a branch point that depends on whether the data packet received relates to registering a NetBIOS resource name. For example, the data packet includes a NetBIOS message in the payload. If not, control passes to step 526 to send the translated data packet. In step 526, if the data packet is received from a device on the corporate network, control passes to step 552 in FIG. 5C.

If it is determined in step 525 that the data packet received relates to registering a NetBIOS resource name, control passes to step 535. For example, if the data packet is received from a device on the corporate network with a NetBIOS acknowledgement or negating acknowledgement, control passes to step 535.

In step 535 it is determined whether the data packet includes a NetBIOS message that indicates a resource name is not registered, for example by explicit release or by a negating acknowledgement. In some embodiments, step 535 includes determining whether a registration period has expired without a renewal message. If the resource name is not registered, control passes to step 536 to remove a data item, e.g., a record, from data structure 424 that includes the resource name.

If it is determined in step 535 that the resource name is registered, then control passes to step 538. In step 538, the resource name is inserted in the data structure 424 with the local IP address, if it is not already there. For example, if the message is a registration request from the local device, the resource name is not already in the data structure 424, and so the resource name is added in a new record. For example, the data item described in Table 3, above, is inserted in data structure 424. If the message is an acknowledgement, the resource name is already in a record in data structure 424 and remains there.

Although the resource name is used in step 538, in other embodiments, other information in the message payload that uniquely indicates the resource may be used.

Also in step 538, if the message is a registration request, the received data packet includes a NetBIOS message with the local IP address in field 214. A translated NetBIOS message, based on the NetBIOS message in the received data packet, is inserted in the second data packet. The translated NetBIOS message includes in the field 214 for the address of the requestor, the corporate address of the intermediate device on which the NAPT process executes.

Control then passes to step 526 to send the translated, second data packet. For example the data packet 324 described above with reference to Table 4 is sent.

——NetBIOS Resource Request

A NetBIOS resource request involves data packets 330, 342, 352 shown in FIG. 3.

Before a NetBIOS resource client requests a NetBIOS resource, the client sends a NetBIOS name query message to the NBNS to obtain the names of available resources. The NetBIOS resource client then requests a named resource. For example, NetBIOS resource client 123 on host 122a requests resource named "StationQuail.fileserver." The resource name is associated with an IP address by the NBNS.

In one embodiment, the NBNS response to the name query includes the IP addresses associated with each name. This response is shown as data packet 330. In another embodiment, only the names are returned in the response; and the request from the resource client for the resource is sent to a NetBIOS Datagram Distribution (NBDD) server. The NBDD server queries the NBNS to obtain the IP address of the named resource, and the NBDD generates and sends the data packet requesting the resource for the NetBIOS resource client. In this embodiment, the NBDD server is the NetBIOS resource client 123 for purposes of the following description, and the NBDD server receives data packet 330.

Data packet 330 is sent from the NBNS to the NetBIOS resource client 123 at time t3 after time t2. The data packet 330 includes a NetBIOS message that provides the IP address stored by the NBNS during registration for the named resource. For example, data packet 330 includes the corporate IP address 125.125.125.130 registered for the NetBIOS resource named StationQuail.fileserver based on data packet 324.

According to the NetBIOS protocol, the source port used by the registration data packet 324 is neither stored by the NBNS nor returned in data packet 330. For example, the translated source port 3000 used by data packet 324 is neither stored by the NBNS nor returned to NetBIOS resource client 123 in data packet 330.

The NetBIOS resource client 123 then generates and sends data packet 342 at time t4 after time t3. The IP address returned in data packet 330 is used as the destination address of data packet 342. For example, the data in field 202 in data packet 342 indicates corporate IP address 125.125.125.130.

According to the NetBIOS protocol, the data packet requesting a NetBIOS resource includes well-known port 138 in the destination port. The translated port for the NetBIOS resource server is not used. For example, the translated port 3000 is not used by the NetBIOS protocol.

It is assumed for purposes of illustration that the corporate IP address is 125.125.125.221 for host 122a of NetBIOS resource client 123, that client 123 has NetBIOS name "StationSparrow.getfile," and that client 123 generates source port 1234. Table 5 shows example values for some of the fields in data packet 342 generated by the NetBIOS resource client 123. Table 5 includes the value for the requested application name, field 216 in FIG. 2.

TABLE 5

Example Data Packet from NetBIOS Resource Client

| Data packet field | Sample Value |
| --- | --- |
| Destination address | 125.125.125.130 |
| Destination port | 138 |
| Source address | 125.125.125.221 |
| Source port | 1234 |
| Requestor's registered name | StationSparrow.getfile |
| Requestor's IP address | 125.125.125.221 |
| Requested application name | StationQuail.fileserver |

The data packet 342 is delivered to the NAPT process on the intermediate device between the NetBIOS resource client 123 and the NetBIOS resource server 133. As shown in FIG. 3, the data packet is delivered to a NetBIOS-enabled NAPT process 135a on router 132. The NetBIOS-enabled NAPT process translates the data in the destination address and the destination port of the data packet 324 into data indicating the local address and port for NetBIOS resource server 133. The translated data is used to generate data packet 352 that is sent to NetBIOS resource server 133 at time t5 after time t4. Table 6 shows example values for some of the fields in data packet 352 generated by the NetBIOS-enabled NAPT process 135a.

TABLE 6

Example Data Packet Sent to NetBIOS Resource Server

| Data packet field | Sample Value |
| --- | --- |
| Destination address | 1.1.1.6 |
| Destination port | 138 |
| Source address | 125.125.125.221 |
| Source port | 1234 |
| Requestor's registered name | StationSparrow.getfile |
| Requestor's IP address | 125.125.125.221 |
| Requested application name | StationQuail.fileserver |

NetBIOS-enabled NAPT process translates the corporate IP address of the intermediate device in the destination address to the local address of the NetBIOS resource server, as described below with reference to FIG. 5C. For example, the corporate IP address 125.125.125.130 is translated to the local IP address 1.1.1.6.

The conventional NAPT process is unable to do this translation. For example, the destination port 138 and the source port 1234 in Table 6 are unrelated to the data item stored in data structure 414 for local address 1.1.1.6, shown in Table 2.

Figure 5C:
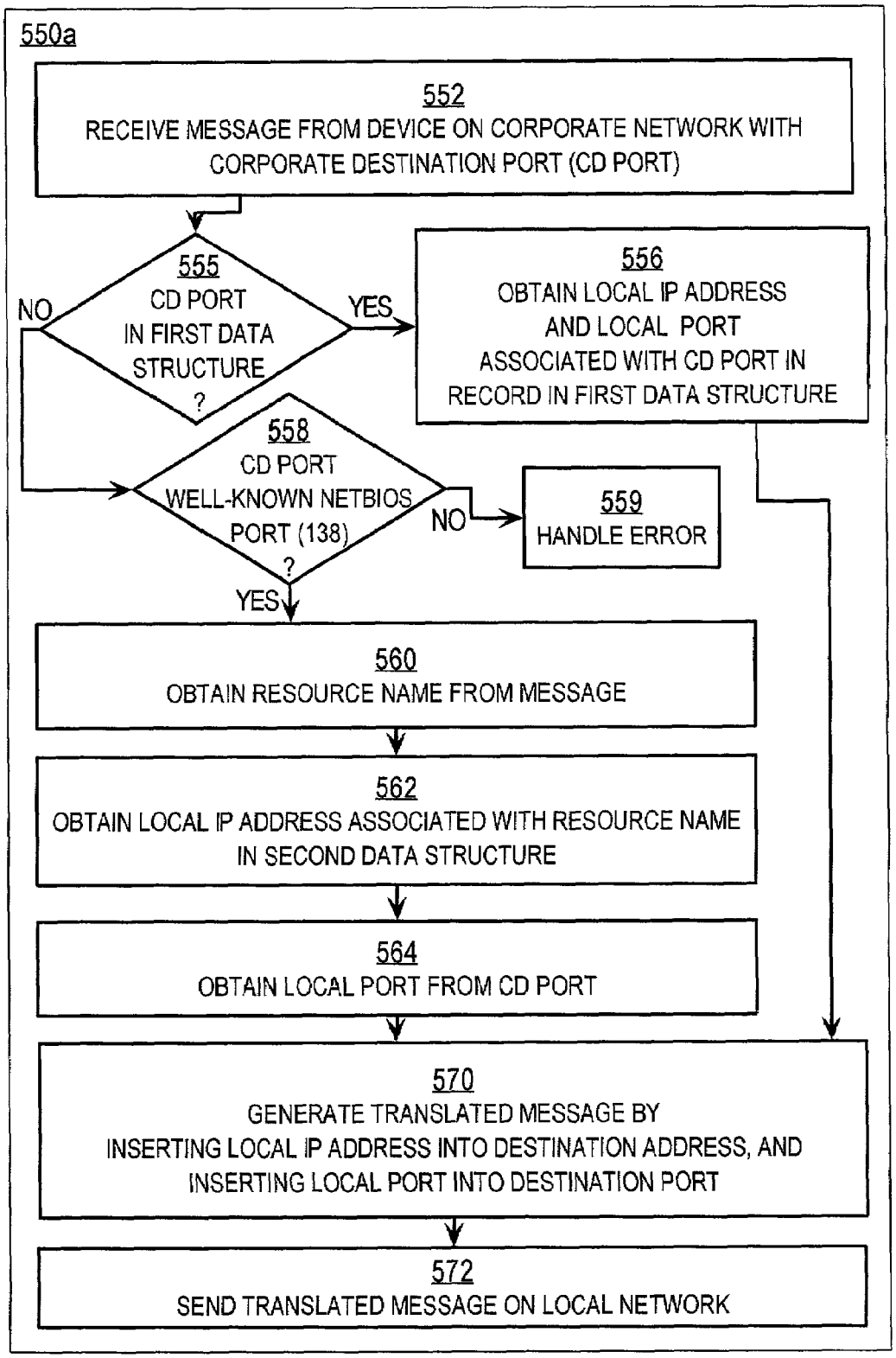
FIG. 5C is a flowchart that illustrates a method for processing NetBIOS resource requests according to one embodiment of the NetBIOS-enabled NAPT process depicted in FIG. 5A.

FIG. 5C is a flowchart that illustrates a method for processing NetBIOS resource requests according to embodiment 550a of step 550 of the NetBIOS-enabled NAPT process depicted in FIG. 5A.

In step 552 a data packet is received from a device on the corporate network. The data packet includes data indicating a particular value in the destination port field. The particular value is herein called the corporate destination port. For example, the NetBIOS resource request data packet 342 is received from host 122a on the corporate network. In the example data packet shown in Table 5, above, the corporate destination port is 138.

It should be noted that the resource request can originate on another local network, such as local network 140. Requests for the resource that originate on host 146c, for example, are translated by NetBIOS-enabled NAPT process 135b to indicate the corporate address of router 142 in the source address field of the data packet received.

In step 555 it is determined whether the corporate destination port can be found in the first data structure 414. For example it is determined whether the value 138 can be found in the translated port field of any data item in first data structure 414.

If so, control passes to step 556 to obtain the local IP address and local, original port from the data item in the first data structure 414 associated with the corporate destination port, as in the conventional NAPT process. For example, the local IP address and original port are obtained from the data item that contains the corporate destination port in the translated port field. Control then passes to step 570 to generate the data packet for the local network, as described below.

If the corporate destination port can not be found in the first data structure 414, control passes to step 558 to determine whether the corporate destination port is a well-known port for the NetBIOS protocol. If not, the data packet is not requesting a NetBIOS resource and an error is indicated. Control passes to step 559 to handle the error, such as by sending a message to the source address.

If the corporate destination port is a well-known port for the NetBIOS protocol then control passes to step 560. For example if the corporate destination port is well-known port 138 for requesting NetBIOS resources, control passes to step 560. In the example data packet the corporate destination port is 138.

In step 560, the resource name is obtained from field 216 for the name of the NetBIOS application requested in the NetBIOS message payload. In the example data of Table 6, the name of the requested application in field 216 is "StationQuail.fileserver."

In step 562, the local IP address associated with the resource name is obtained from the new data structure 424. For example, in Table 3, the local IP address 1.1.1.6 is associated with the resource name StationQuail.fileserver as both are in the same data item.

Although the resource name is used in steps 560, 562, in other embodiments, other information in the message payload that uniquely indicates the resource for requests may be used.

In step 564, the local destination port is obtained from the corporate destination port, to satisfy the NetBIOS protocol to use well-known port 138 for requests of NetBIOS resources.

In step 570, a translated data packet 352 is generated based on packet 342 by inserting data indicating the local IP address into the destination address field 202 and inserting the local port into destination port field 206. In embodiments in which the destination port is the same in both data packets 342 and 352, only the local IP address has to be inserted into data packet 352.

In step 572, the translated data packet is sent over local network. For example, data packet 352 is sent over local network 130 to host 126c having local IP address 1.1.1.6.

Figure 6:
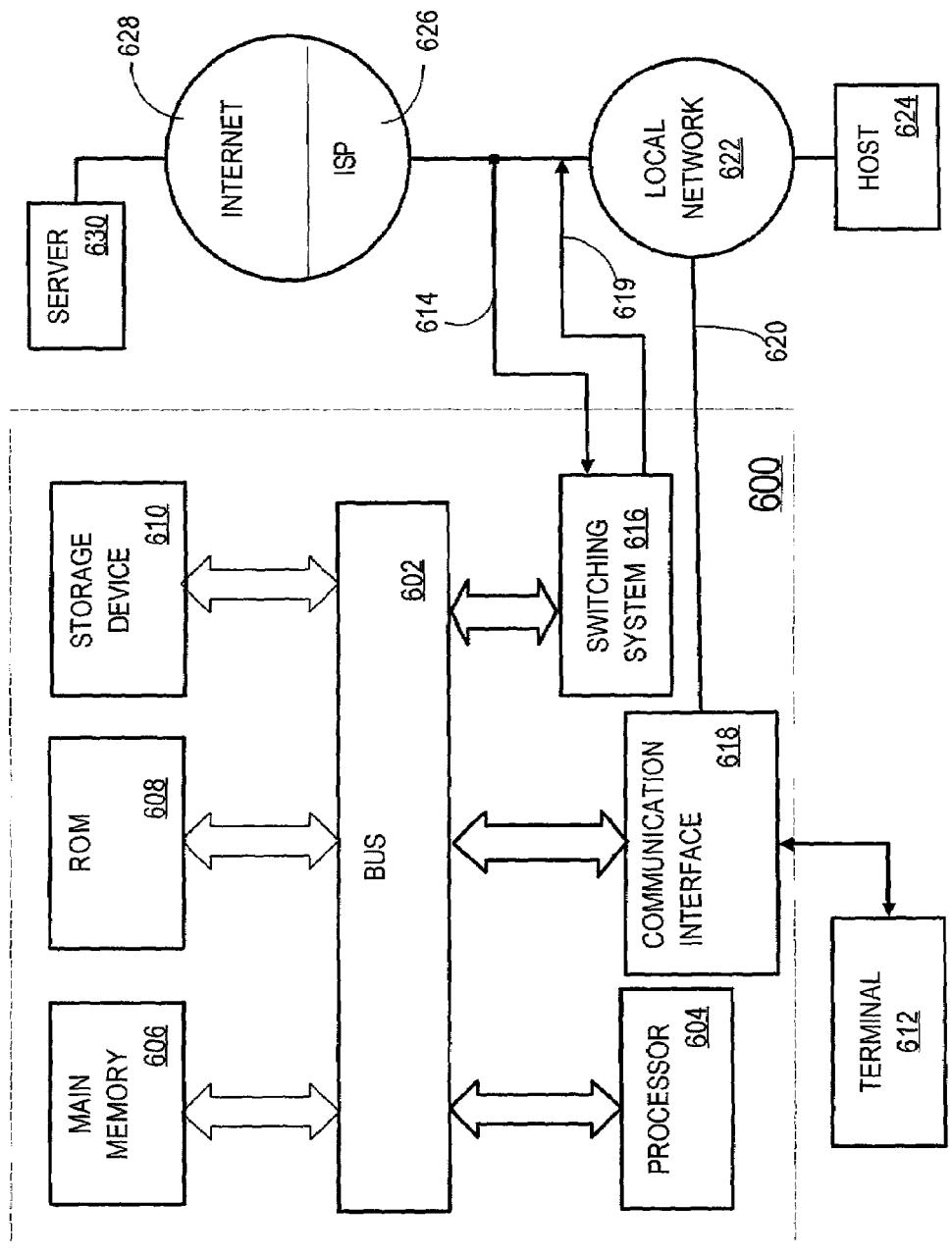
FIG. 6 is a block diagram that illustrates a router upon which an embodiment may be implemented.

Thus the data packets with NetBIOS messages are successfully translated with the NetBIOS-enabled NAPT process. Therefore, these techniques allow a network address and port translation (NAPT) process to function for the NetBIOS protocol —Hardware Overview FIG. 6 is a block diagram that illustrates a computer system 600 upon which an embodiment of the Invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Communication interface 618 may also be coupled to a network link 620 that is connected to a local network 622. In some embodiments, interface 618 is a conventional serial interface such as an RS-232 or RS-422 interface. An external terminal 612 or other computer system connects to the computer system 600 and provides commands to it using the interface 618. Firmware or software running in the computer system 600 provides a terminal interface or character-based command interface so that external commands can be given to the computer system.

A switching system 616 is coupled to bus 602 and has a first interface 614 and an second interface 619 to one or more external network elements. The external network elements may include a local network 622 coupled to one or more hosts 624, or a global network such as Internet 628 having one or more servers 630. The switching system 616 switches information traffic arriving on first interface 614 to second interface 619 according to pre-determined protocols and conventions that are well known. For example, switching system 616, in cooperation with processor 604, can determine a destination of a packet of data arriving on first interface 614 and send it to the correct destination using second interface 619. The destinations may include host 624, server 630, other end stations, or other routing and switching devices in local network 622 or Internet 628.

The invention is related to the use of computer system 600 for network address and port translation. According to one embodiment of the invention, network address and port translation is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

The second interface 619 of switching system 616 provides a two-way data communication coupling to the local network 622. For example, interface 619 may be an integrated services digital network (ISDN) card or a modem to provide a data communication connection to a corresponding type of telephone line. As another example, interface 619 may be a local area network (LAN) card to provide a data communication connection to a compatible LAN. Wireless links may also be implemented. In any such implementation, interface 619 sends and receives electrical, electromagnetic or optical signals that carry digital data streams representing various types of information.

Interfaces 614 and 619 typically provides data communication through one or more networks to other data devices.

For example, interface 619 may provide a connection through local network 622 to a host computer 624; while interface 614 provides a connection to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on interfaces 614, 619 through switching system 616, which carry the digital data to and from computer system 600, are exemplary forms of carrier waves transporting the information.

Computer system 600 can send messages and receive data, including program code, through the network(s), interfaces 614, 619 and switching system 616. In the Internet example, a server 630 might transmit a requested code for an application program through Internet 628, ISP 626, and interface 614. In accordance with the invention, one such downloaded application provides for network address and port translation as described herein.

The received code may be executed by processor 604 as it is received, and/or stored in storage device 610, or other non-volatile storage for later execution. In this manner, computer system 600 may obtain application code in the form of a carrier wave.

—Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for translating between logical addresses and ports of a first network and a logical address and ports of a second network connected to the first network at an intermediate device, the method comprising the computer-implemented step of:

receiving at the intermediate device a first packet from a first device having a first address on the first network;

sending a second packet to a second device on the second network in response to receiving the first packet, the second packet including, in a source address field, data indicating a particular address of the intermediate device on the second network;

determining whether the first packet includes a first message that registers a first resource on the first device with a protocol server for a particular protocol, the protocol server available at the second device on the second network, wherein:

the particular protocol does not support translated ports for requesting network resources, and the protocol server is configured to register unique names for resources provided by devices on the second network according to the particular protocol; and if it is determined that the first packet includes the first message registering the first resource, then determining first information in the first message for uniquely requesting the first resource, and storing data indicating the first information in a first data structure in association with the first address, wherein the intermediate device performs the steps of determining the first information in the first message and storing data indicating the first information in the first data structure.

2. A method as recited in claim 1, further comprising the computer-implemented step of:

receiving at the intermediate device a third packet from a third device on the second network;

determining whether the third packet includes a second message requesting a second resource according to the particular protocol; and if it is determined that the third packet includes the second message requesting the second resource, then determining second information in the second message for uniquely requesting the second resource, determining whether the second information matches the first information in the data structure, and if the second information matches the first information, sending the second message to the first device having the first address associated with the first information.

3. A method as recited in claim 1, wherein, if it is determined that the first packet includes the first message, then inserting in the second packet a second message based on the first message.

4. A method as recited in claim 3, wherein the second message is the same as the first message.

5. A method as recited in claim 3, further comprising the computer-implemented step of generating the second message by replacing, in a source address field, data indicating the first address with data indicating the particular address of the intermediate device on the second network.

6. A method as recited in claim 1, wherein a source port field in the first packet includes data indicating a first source port;

said step of sending the second packet to the second device further comprises storing in a second data structure uniquely associated with the first address and the first source port a particular translated port, and inserting data indicating the particular translated port into a source port field of the second packet.

7. A method as recited in claim 1, wherein the particular protocol uses a well-known port for requesting the first resource.

8. A method as recited in claim 1, wherein the particular protocol is a network basic input and output system (NetBIOS) open protocol.

9. A method as recited in claim 1, wherein the protocol server is a network basic input and output system (NetBIOS) name server.

10. A method as recited in claim 1, wherein the first information is a resource name.

11. A method as recited in claim 5, wherein the protocol server is a name server that stores a resource name of the first resource in the second message in association with an address based on data in the source address field of the second message.

12. A method as recited in claim 1, wherein the protocol server is a name server that stores data indicating a resource name of the first resource, and does not store data in a source port field of the second packet in association with the resource name.

13. A method as recited in claim 2, wherein the third packet includes, in a destination address field, data indicating the particular address of the intermediate device.

14. A method as recited in claim 2, said step of determining whether the third packet includes the second message comprising determining whether a destination port field in the third packet includes data indicating a well-known port associated with requesting a resource according to the particular protocol.

15. A method as recited in claim 1, further comprising the computer-implemented steps of:
- monitoring messages associated with registering the first resource with the protocol server;
- determining whether the first resource is not registered with the protocol server; and
- if it is determined that the first resource is not registered with the protocol server, then removing from the first data structure the data indicating the first information in association the first address.

16. A computer-readable medium carrying one or more sequences of instructions for translating between logical addresses and ports of a first network, and logical addresses and ports of a second network connected to the first network at an intermediate device, which instructions, when executed by one or more processors, cause the one or more processors to carry out the steps of:
- receiving at the intermediate device a first packet from a first device having a first address on the first network;
- sending a second packet to a second device on the second network in response to receiving the first packet, the second packet including, in a source address field, data indicating a particular address of the intermediate device on the second network;
- determining whether the first packet includes a first message that registers a first resource on the first device with a protocol server for a particular protocol, the protocol server available at the second device on the second network, wherein:
  - the particular protocol does not support translated ports for requesting network resources, and
  - the protocol server is configured to register unique names for resources provided by devices on the second network according to the particular protocol; and
- if it is determined that the first packet includes the first message registering the first resource, then
  - determining first information in the first message for uniquely requesting the first resource, and
  - storing data indicating the first information in a first data structure in association with the first address,
  - wherein the intermediate device performs the steps of determining the first information in the first message and storing data indicating the first information in the first data structure.

17. An apparatus comprising an intermediate networking device for translating between logical addresses and ports of a first network, and logical addresses and ports of a second network connected to the first network at the intermediate device, comprising:
- means for receiving at the intermediate device a first packet from a first device having a first address on the first network;
- means for sending a second packet to a second device on the second network in response to receiving the first packet, the second packet including, in a source address field, data indicating a particular address of the intermediate device on the second network;
- means for determining whether the first packet includes a first message that registers a first resource on the first device with a protocol server for a particular protocol, the protocol server available at the second device on the second network, wherein:
  - the particular protocol does not support translated ports for requesting network resources, and
  - the protocol server is configured to register unique names for resources provided by devices on the second network according to the particular protocol;
- means for determining first information in the first message for uniquely requesting the first resource, if it is determined that the first packet includes the first message, and
- means for storing data indicating the first information in a first data structure in association with the first address, if it is determined that the first packet includes the first message.

18. An apparatus comprising an intermediate networking device for translating between logical addresses and ports of a first network, and logical addresses and ports of a second network connected to the first network through the intermediate device, comprising:
- a first network interface that is coupled to the first network for sending and receiving messages thereon;
- a second network interface that is coupled to the second network for sending and receiving messages thereon;
- a processor;
- one or more stored sequences of instructions which, when executed by the processor, cause the processor to carry out the steps of:
  - receiving at the intermediate device a first packet from a first device having a first address on the first network;
  - sending a second packet to a second device on the second network in response to receiving the first packet, the second packet including, in a source address field, data indicating a particular address of the intermediate device on the second network;
  - determining whether the first packet includes a first message that registers a first resource on the first device with a protocol server for a particular protocol, the protocol server available at the second device on the second network, wherein:
    - the particular protocol does not support translated ports for requesting network resources, and
    - the protocol server is configured to register unique names for resources provided by devices on the second network according to the particular protocol; and
  - if it is determined that the first packet includes the first message registering the first resource, then
    - determining first information in the first message for uniquely requesting the first resource, and
    - storing data indicating the first information in a first data structure in association with the first address.

19. An apparatus as recited in claim 17, further comprising:
- means for receiving at the intermediate device a third packet from a third device on the second network;
- means for determining whether the third packet includes a second message requesting a second resource according to the particular protocol;
- means for determining second information in the second message for uniquely requesting the second resource, if it is determined that the third packet includes the second message requesting the second resource;
- means for determining whether the second information matches the first information in the data structure if it is determined that the third packet includes the second message requesting the second resource; and means for sending the second message to the first device having the first address associated with the first information, if it is determined that the third packet includes the second message requesting the second resource and if the second information matches the first information.

20. An apparatus as recited in claim 17, wherein:
a source port field in the first packet includes data indicating a first source port; and
the means for sending the second packet to the second device further comprises:
means for storing in a second data structure uniquely associated with the first address and the first source port a particular translated port, and
means for inserting data indicating the particular translated port into a source port field of the second packet.

21. An apparatus as recited in claim 17, wherein the particular protocol is a network basic input and output system (NetBIOS) open protocol.

22. An apparatus as recited in claim 17, further comprising:
means for inserting in the second packet a second message based on the first message, if it is determined that the first packet includes the first message; and
means for generating the second message by replacing, in a source address field, data indicating the first address with data indicating the particular address of the intermediate device on the second network, wherein the protocol server is a name server that stores a resource name of the first resource in the second message in association with an address based on data in the source address field of the second message.

23. An apparatus as recited in claim 17, further comprising:
means for monitoring messages associated with registering the first resource with the protocol server;
means for determining whether the first resource is not registered with the protocol server; and
means for removing from the first data structure the data indicating the first information in association the first address, if it is determined that the first resource is not registered with the protocol server.

24. An apparatus as recited in claim 18, wherein the one or more stored sequences of instructions further comprise instructions which, when executed by the processor, cause the processor to carry out the steps of:
receiving at the intermediate device a third packet from a third device on the second network;
determining whether the third packet includes a second message requesting a second resource according to the particular protocol; and
if it is determined that the third packet includes the second message requesting the second resource, then
determining second information in the second message for uniquely requesting the second resource,
determining whether the second information matches the first information in the data structure, and
if the second information matches the first information, sending the second message to the first device having the first address associated with the first information.

25. An apparatus as recited in claim 18, wherein:
a source port field in the first packet includes data indicating a first source port; and
the sequences of instructions which cause the processor to carry out the step of sending the second packet to the second device further comprise instructions which, when executed by the processor, cause the processor to carry out the steps of:
storing in a second data structure uniquely associated with the first address and the first source port a particular translated port, and
inserting data indicating the particular translated port into a source port field of the second packet.

26. An apparatus as recited in claim 18, wherein the particular protocol is a network basic input and output system (NetBIOS) open protocol.

27. An apparatus as recited in claim 18, wherein the one or more stored sequences of instructions further comprise instructions which, when executed by the processor, cause the processor to carry out the steps of:
if it is determined that the first packet includes the first message, then inserting in the second packet a second message based on the first message; and
generating the second message by replacing, in a source address field, data indicating the first address with data indicating the particular address of the intermediate device on the second network, wherein the protocol server is a name server that stores a resource name of the first resource in the second message in association with an address based on data in the source address field of the second message.

28. An apparatus as recited in claim 18, wherein the one or more stored sequences of instructions further comprise instructions which, when executed by the processor, cause the processor to carry out the steps of:
monitoring messages associated with registering the first resource with the protocol server;
determining whether the first resource is not registered with the protocol server; and
if it is determined that the first resource is not registered with the protocol server, then removing from the first data structure the data indicating the first information in association the first address.

* * * * *